Figure 1:
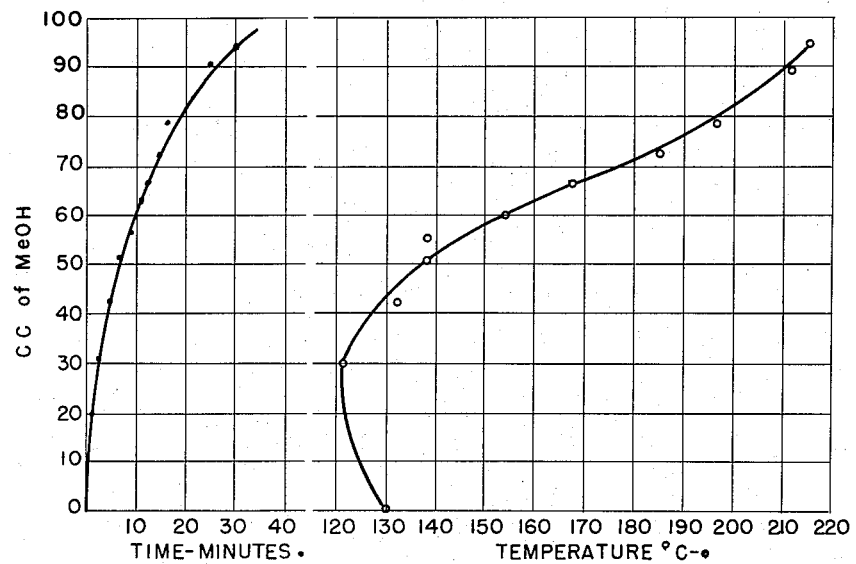

Dec. 8, 1953   H. R. BILLICA   2,662,093
PROCESS OF PREPARING MONOMERIC GLYCOL TEREPHTHALATES
Filed Sept. 28, 1951   3 Sheets—Sheet 1

INVENTOR:
HARRY R. BILLICA
BY
ATTORNEY.

Dec. 8, 1953  H. R. BILLICA  2,662,093
PROCESS OF PREPARING MONOMERIC GLYCOL TEREPHTHALATES
Filed Sept. 28, 1951  3 Sheets-Sheet 2
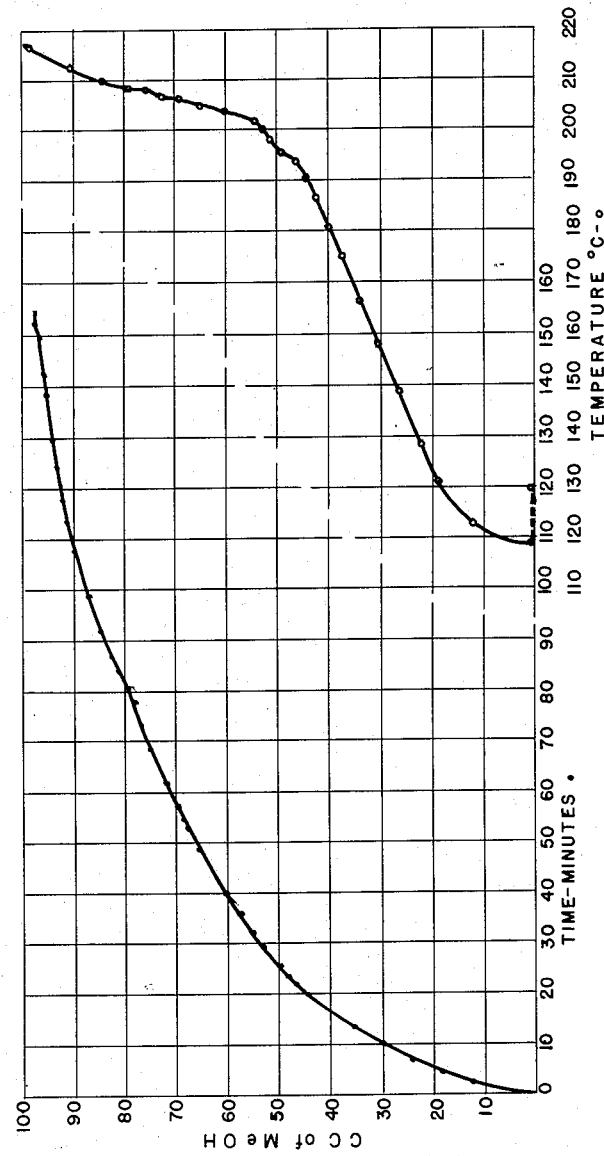
INVENTOR:
HARRY R. BILLICA
BY
ATTORNEY.

INVENTOR:
HARRY R. BILLICA
BY
ATTORNEY.

Patented Dec. 8, 1953

2,662,093

UNITED STATES PATENT OFFICE 2,662,093

PROCESS OF PREPARING MONOMERIC GLYCOL TEREPHTHALATES

Harry R. Billica, Seaford, Del., assignor to E. I. du Pont de Nemours and Company, Wilmington, Del., a corporation of Delaware Application September 28, 1951, Serial No. 248,679

2 Claims. (Cl. 260—475)

This invention relates to an improved process for preparing a synthetic film- and fiber-forming synthetic linear polyester, and more particularly to a process of preparing monomeric glycol terephthalates by an ester interchange reaction between a glycol and a dialkyl ester of terephthalic acid.

The product of the novel class of film- and fiber-forming linear polyesters of terephthalic acid and a glycol of the series $HO(CH_2)_nOH$ wherein "$n$" is an integer from 2 to 10 inclusive, is fully described in United States Patent No. 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxy-ethyl terephthalate monomer which is polymerized to polyethylene terephthalate under reduced pressure and at an elevated temperature.

The above patent discloses a considerable number of catalysts suitable for accelerating the rate of ester interchange to form bis-2-hydroxy-ethyl terephthalate monomer. Among such catalysts are included sodium, lithium, potassium, calcium, magnesium, zinc, cadmium and aluminum, as well as alkaline metals in the form of their carbonates or other alkaline-reacting salts, for example, the borates; also, the oxides of various of these metals. In general, it has been found that lithium, sodium and calcium metals are comparatively better than the other above mentioned metals for accelerating the rate of ester interchange between a glycol and a terephthalate ester of a saturated aliphatic monohydric alcohol. However, to blend or dissolve these metals in the glycol-terephthalate reaction mixture is a difficult and time-consuming operation, chiefly because they are so reactive chemically that they are not readily available in the finely-divided form necessary for easy and rapid blending. Moreover, these metals, particularly metallic sodium and lithium, by reason of their chemical activity, are troublesome to handle and present serious health hazards as well.

An object of the present invention is to provide highly efficient catalysts for accelerating the ester interchange reaction between a glycol and a terephthalate ester of a saturated aliphatic monohydric alcohol which are free of the disadvantages which attend the use of sodium, lithium and calcium.

I have discovered that compounds from the group consisting of lithium hydride (LiH), sodium hydride (NaH), and calcium hydride ($CaH_2$), all of which are available in finely-divided state, are effective for promoting the ester interchange reaction between a dihydric alcohol such as glycol and an alkyl ester of a dibasic acid such as dimethyl terephthalate, and their catalytic activity exceeds that of the corresponding metals. Therefore, the above and other objects are realized by my invention, which comprises carrying out the ester interchange reaction in the presence of catalytic amounts of a metal hydride from the group consisting of lithium, sodium and calcium hydrides.

The process of the present invention will hereinafter specifically be described with respect to the preparation of bis-2-hydroxy-ethyl terephthalate monomer by an ester interchange reaction between ethylene glycol and dimethyl terephthalate, which process constitutes the preferred embodiment of my invention. The invention, however, is applicable, in general, to the preparation of other monomeric glycol terephthalates by conducting an ester interchange reaction between various other glycols of the series $HO(CH_2)_nOH$, where "$n$" is an integer within the range of 2 to 10 inclusive, and various other alkyl terephthalates, i. e., terephthalate esters of saturated aliphatic monohydric alcohols containing up to and including four carbon atoms, e. g., diethyl, dipropyl and diisobutyl terephthalates. Various specific glycols include trimethylene glycol, tetramethylene glycol, pentamethylene glycol, hexamethylene glycol, heptamethylene glycol, octamethylene glycol, etc. The catalysts of the present invention may also be employed in carrying out ester interchange reactions between mixtures of different esters and at least one polymethylene glycol or polyethylene glycol. For example, a mixture of dimethyl terephthalate, dimethyl sebacate and ethylene glycol may be reacted together to form the mixed esters which, in turn, may be polymerized to form a linear copolyester. Ester interchange reactions of this type are illustrated in copending applications U. S. S. N. 150,811 and U. S. S. N. 150,812, filed March 20, 1950 in the name of Mark D. Snyder.

In general, based upon the weight of the monohydric alcohol ester of the dibasic acid, e. g., dimethyl terephthalate, hydride catalyst concentrations between 0.004% and 0.05% are effective. In amounts less than about 0.005% catalyst, the reaction rate is too slow for commercial operation. Hydride concentrations greater than about 0.03% are not necessary; and, usually, amounts appreciably greater than 0.05% will produce such rapid initial reaction rates as to increase the hazards of the reaction, and, of course, unnecessarily increase cost. It is preferred to employ between 0.005% and 0.03%.

The hydrides of this invention may be incorporated or blended into the initial reaction mixture by any suitable expedient. Preferably, the hydrides are employed in finely-divided or powdered form and are dissolved directly in the reaction mixture. Alternatively, the hydride may conveniently be dissolved in the cold dihydric alcohol, e. g., glycol, which, in turn, may be blended with the hot mixture of the glycol and dibasic acid ester.

The ester interchange reaction is carried out at a temperature of from about 110° C. to about 260° C., the exact range depending upon the catalyst used. Calcium hydride and the alkali metal hydrides of this invention are most active at the lower temperature ranges, i. e., at temperatures within the range of from 110°–160° C. Preferably, the reaction is carried out at atmospheric pressure. However, in certain instances, it may be necessary to carry out at least the final stages of the reaction under reduced pressure in order to effect complete removal of the monohydric alcohol. Further, it is possible to carry out the reaction under pressures greater than atmospheric; but, in general, this is not economical.

For commercial operation, the hydrides of this invention have been found to be highly useful in ester interchange reactions which are to be carried out continuously. For example, an ester interchange reaction between ethylene glycol and dimethyl terephthalate was carried out in a cylindrical tower comprising a number of individually heated plates. On top of the tower was a reflux condenser maintained at about 65° C. (the boiling point of methanol). The top plate which was just beneath the reflux condenser was maintained at about 160–170° C. A solution of dimethyl terephthalate in ethylene glycol was introduced at the top plate in a single stream, and a catalyst composition comprising lithium hydride dissolved in glycol was introduced as a separate feed. The plate below the top plate was maintained at a slightly higher temperature, and each plate below the one above was at a higher temperature. The reboiler at the bottom of the column was maintained at a temperature of about 250° C. Owing to the high activity of the lithium hydride catalyst at a temperature 160°–170° C., a substantial amount of methanol was liberated at the top plate; and this methanol immediately vaporized into the condenser at the top of the ester interchange column. Along with the vaporous methanol, a certain amount of ethylene glycol and dimethyl terephthalate also vaporized into the reflux condenser. If the top plate temperature were maintained at a higher temperature, larger amounts of glycol and dimethyl terephthalate would vaporize into the reflux condenser. Such conditions would eventually result in appreciable clogging of the reflux condenser with sublimed dimethyl terephthalate, and it is essential to maintain the top plate at a temperature below about 170° C. to avoid this. Hence, by employing a catalyst which is highly active at such lower temperatures, the top plate may be maintained at 160–170° C.; and the amount of reflux is reduced as compared with that which would occur if the top plate were required to be at a higher temperature to activate the catalyst. By this process, monomeric ethylene glycol terephthalate can be continuously and economically produced.

The ester interchange reaction is usually the first step in the preparation of a polymeric polymethylene glycol terephthalate; and the polymerization step must be carried out under reduced pressure in the vicinity of 0.05–20 mm. of mercury, 0.05–5.0 mm. being preferred for optimum results. Reduced pressure is necessary to remove the free glycol which emerges from the polymer as a result of the condensation reaction, since the reaction mixture is very viscous. A temperature between about 230°–290° C., and preferably between 260°–275° C., should be maintained during the polymerization step.

The following examples further illustrate the practice, principles, and advantages of the process of this invention. Parts are by weight unless otherwise indicated. In all examples, the following procedure was employed with the results illustrated in the graphs of the accompanying drawings:

The ester interchange reactions are carried out in a 1-liter flask fitted with an 18″ glass fractionating column (2″ in diameter) packed with ⅜″ glass rings; and the fractionating column was fitted with a side take-off condenser. The flask was heated electrically, and the amount of heat to the flask was controlled by varying the power input. In all cases, 242 grams of dimethyl terephthalate were reacted with 180 cc. of ethylene glycol. A homogeneous mixture of glycol and dimethyl terephthalate was made by blending these materials at a temperature between 135°–150° C. Dimethyl terephthalate melts at about 140° C. The concentration of the catalytic materials employed was based upon the weight of dimethyl terephthalate, and in all cases, the catalyst was added directly to the blend of glycol and dimethyl terephthalate. The methanol liberated during the ester interchange reaction was collected in a graduate, and the amount of methanol collected was recorded at various time intervals. The theoretical amount of methanol was 100 cc., and the reaction was complete when this amount was collected. At the same time intervals, the temperature of the reaction liquid was also measured. The heat input to the flask was varied in order to maintain a temperature of about 65° C. (the boiling point of methanol at atmospheric pressure) at the top of the fractionating column. For each catalyst, the amount of methanol collected was plotted against the elapsed time and the temperature of the reaction liquid at that time. These data are plotted in graph form in Figures 1–4, inclusive.

*Example I*

Following the procedure outlined above, 0.02% of lithium hydride was used as the ester interchange catalyst. The reaction was started at 130° C., and it will be noted from the contour of the temperature curve (Fig. 1) that the liberation of methanol at the beginning of the reaction was so vigorous that the temperature in the flask dropped momentarily below the actual starting temperature. As more and more methanol was removed from the reaction flask, it was necessary to raise the temperature to distill the remaining portions. As shown in Fig. 1, in the plot of time versus cc. of methanol withdrawn, the reaction rate is very rapid up to the point at which about 80–90 cc. of methanol are withdrawn. After that point, the reaction rate tapers off.

Example II

This example illustrates the use of lesser amounts of lithium hydride (0.007%). The reaction was started at 120° C. The graph of Fig. 2 shows that the reaction rate at the beginning is quite rapid but the use of such smaller amounts of lithium hydride alone is not sufficient to carry the reaction rapidly to completion.

Example III

Figure 3:
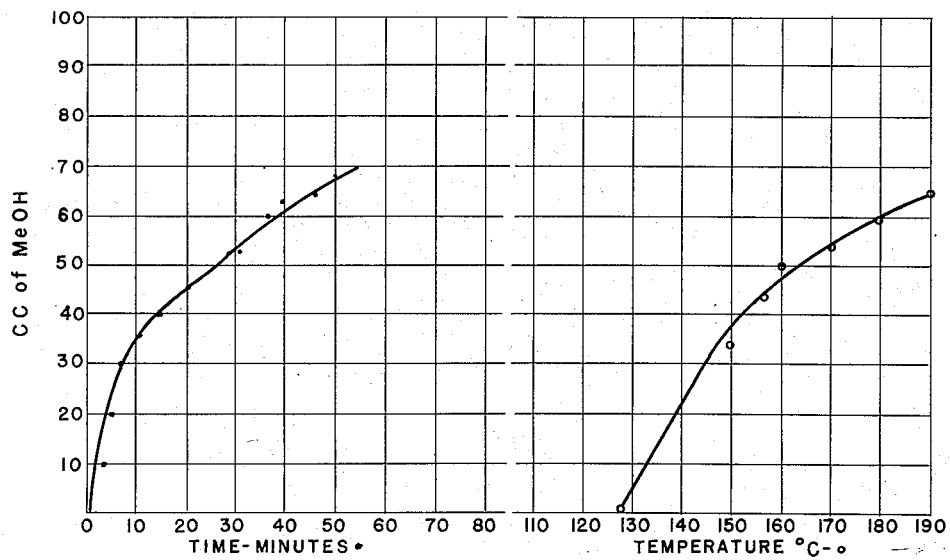
Figure 4:
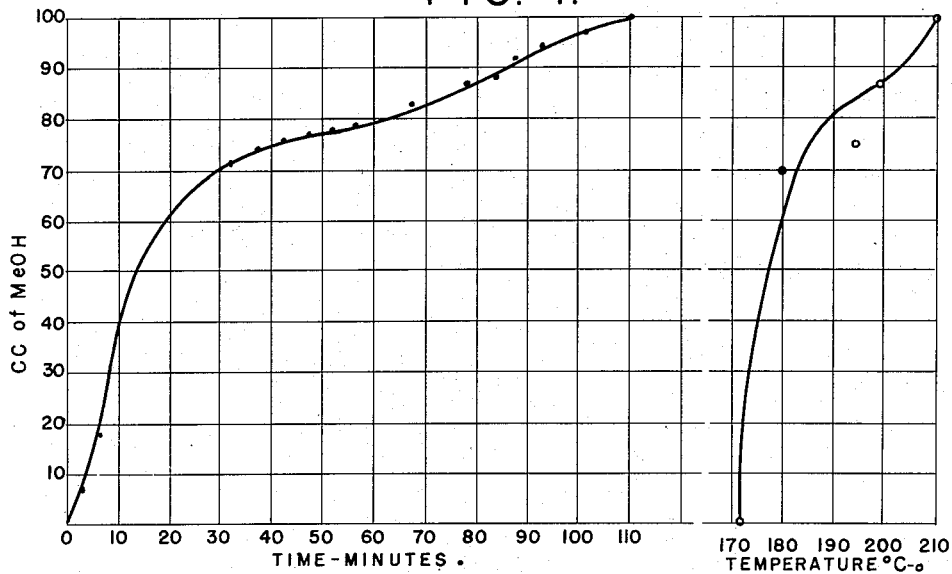

In this example, 0.03% sodium hydride was employed with a starting temperature of about 127° C. As shown in Fig. 3, this concentration of sodium hydride (compared with 0.02% of lithium hydride in Fig. 1) tends to give a rapid reaction rate up to removal of about 30 cc. of methanol. After that point, however, the curve falls off sharply.

Example IV

Following the procedure of the previous examples, 0.03% of calcium hydride was used as catalyst; and the ester interchange reaction was initiated at a temperature of about 172° C. The rate of reaction, shown in Fig. 4, up to removal of about 60 cc. of methanol, is reasonably rapid; but after that point, the rate drops abruptly as the temperature is increased further to remove more methanol.

Example V 100 grams of dimethyl terephthalate and 100 milliliters of ethylene glycol (approximately a glycol/dimethyl terephthalate mol ratio of 3/1) and 100 to 500 milligrams (0.01 to 0.05 weight per cent of dimethyl terephthalate) of calcium hydride were weight into a 300-milliliter, round-bottom flask fitted with a thermometer and a Claisen type still head with a side arm condenser. Heat was applied by an electric mantle. The pot temperature at the first drop of methanol distillation was recorded at the start of ester interchange, and the time for collection of the theoretical amount of methanol was recorded as the total time required for ester interchange.

Methanol evolution started at 115–120° C., using 0.03 to 0.05% of calcium hydride. When using only 0.01% of calcium hydride, methanol evolution started at somewhat higher temperatures (up to 160–170° C.). For catalyst concentrations ranging from 0.03 to 0.05% of calcium hydride, the reaction was generally complete at a temperature of about 200° C. in 90–120 minutes.

Example VI

Using a stainless steel, Dowthern-heated vessel fitted with a packed distillation column and condenser, 0.03% of calcium hydride was used as the ester interchange catalyst in semi-works production on a scale based on a charge of 50–70 pounds of dimethyl terephthalate. Ester interchange started at 110°–120° C. and was generally complete in 3–3½ hours' time. Polymerization of the resulting bis-2-hydroxy-ethyl terephthalate monomer resulted in the formation of substantially colorless polymer.

As illustrated in Figs. 1 and 2, lithium hydride catalyst is highly active at a temperature in the vicinity of 130° C., and the catalyst remains active up to temperatures in the neighborhood of 170° C. At temperatures greater than about 165°–170° C., the catalytic activity of lithium hydride decreases abruptly until at higher temperatures, the catalyst appears to be relatively inactive for promoting the ester interchange process of the present invention. In carrying out ester interchange reactions in batch reaction vessels similar to the apparatus used in preparing the foregoing examples of this invention, the starting temperature may be reasonably low, that is, about 110° C., when a low temperature catalyst such as lithium hydride is used. Starting at such relatively low temperatures is advantageous from the standpoint of the lower heat input required and the rapid reaction obtainable at low temperatures. As the reaction proceeds, however, to about 50–60% completion, it is then necessary to increase the temperature to assure complete removal of methanol from the reaction mixture. As shown in Fig. 1, the reaction is about 50–60% complete in a very short time, about 8–10 minutes, and thereafter the reaction rate drops off as the temperature is raised to distill off the remaining methanol. Reaction at this stage can be facilitated and brought to rapid conclusion by operating under vacuum. Alternatively, the complete reaction may be carried out at atmospheric pressure employing lithium hydride in combination with selected known ester interchange catalysts, as disclosed and claimed in the copending application of Joseph L. Vodonik, U. S. Serial No. 248,708, filed September 28, 1951.

Since it is obvious that various changes may be made in the matter of details without departing from the broad spirit and scope of my invention, it is to be understood that said invention is in no way restricted save as set forth in the following claims.

I claim:

1. In the process which comprises reacting a glycol of the formula, $HO(CH_2)_nOH$, where "$n$" is an integer from 2 to 10 inclusive, with an alkyl ester of terephthalic acid having 1 to 4 carbon atoms in the alkyl group under conditions to effect ester interchange, the improvement which comprises carrying out the ester interchange in the presence of a catalyst from the group consisting of lithium hydride, sodium hydride, and calcium hydride.

2. The process for forming bis-2-hydroxy-ethyl terephthalate which comprises heating glycol and dimethyl terephthalate at temperatures within the range of from 110° to 260° C. in the presence of a catalyst from the group consisting of lithium hydride, sodium hydride, and calcium hydride, and continuing the heating until no more methyl alcohol is evolved.

HARRY R. BILLICA.

References Cited in the file of this patent

UNITED STATES PATENTS

| Number | Name | Date |
|---|---|---|
| 2,558,547 | Eckey | June 26, 1952 |

FOREIGN PATENTS

| Number | Country | Date |
|---|---|---|
| 623,669 | Great Britain | May 20, 1949 |

OTHER REFERENCES

Groggins, Unit Processes of Organic Chemistry, third edition (1947), pp. 635–637.